United States Patent
Wyse

(10) Patent No.: US 6,789,437 B2
(45) Date of Patent: Sep. 14, 2004

(54) APPARATUS FOR PRECISION SLEWING OF FLATFORM-MOUNTED DEVICES

(75) Inventor: Stanley F. Wyse, Encino, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 0 days.

(21) Appl. No.: 09/919,522

(22) Filed: Jul. 31, 2001

(65) Prior Publication Data

US 2003/0024333 A1 Feb. 6, 2003

(51) Int. Cl.$^7$ .............................................. G01C 19/54
(52) U.S. Cl. ........................ 74/5.4; 74/5.5; 74/5.6 E; 74/5.7; 74/5.22; 74/5.46; 74/5.47
(58) Field of Search ........................ 74/5.4, 5.5, 5.46, 74/5.47, 5.6 E, 5.7, 5.22

(56) References Cited

U.S. PATENT DOCUMENTS

| | | | | |
|---|---|---|---|---|
| 3,762,226 A | * | 10/1973 | Davis et al. .................. 74/5 F |
| 3,906,804 A | * | 9/1975 | Atkinson et al. .......... 74/5.6 D |
| 4,189,946 A | * | 2/1980 | Hoffman et al. ............... 74/5.4 |
| 4,189,947 A | * | 2/1980 | Friedland ...................... 74/5.4 |
| 4,320,669 A | * | 3/1982 | Grohe ..................... 73/504.03 |
| 4,458,554 A | * | 7/1984 | Hrastar ........................ 73/468 |
| 4,487,083 A | * | 12/1984 | Quermann ..................... 74/5 F |
| 4,591,117 A | * | 5/1986 | Scott ........................... 244/169 |
| 4,848,169 A | * | 7/1989 | Duncan et al. ............... 74/5 F |
| 5,138,883 A | * | 8/1992 | Paquet et al. ............ 73/504.18 |
| 5,868,031 A | * | 2/1999 | Kokush et al. .............. 74/5.34 |
| 6,145,393 A | * | 11/2000 | Canton ....................... 74/5.43 |
| 6,154,317 A | * | 11/2000 | Segerstrom et al. ........ 359/554 |

* cited by examiner

*Primary Examiner*—Saúl Rodriguez
*Assistant Examiner*—David D. Le
(74) *Attorney, Agent, or Firm*—Elliott N. Kramsky

(57) ABSTRACT

An apparatus and a method for controlling the path of oscillatory travel of a device within a two-axis system. A device, such as a camera, is held in a two axis gimbal system having motors for driving the azimuth and pitch axes. A two degree-of-freedom gyroscope is fixed to the case of the device. A first derivative circuit is interposed between a first input port for a loop for controlling device movement with respect to a first axis and a second input port for a loop for controlling device movement with respect to a second axis. Likewise, a second derivative circuit is interposed between the two input ports so that a periodic signal driving with respect to one axis generates a derivative function for driving with respect to the cross-axis. The cross axis signal is scaled to counteract the direct torquing of the gyro rotor that otherwise prevents smooth oscillatory slewing or scanning by the device.

12 Claims, 4 Drawing Sheets

APPARATUS FOR PRECISION SLEWING OF FLATFORM-MOUNTED DEVICES

BACKGROUND

The present invention relates to apparatus and methods for precision slewing, or pointing, a platform-mounted device, such as a camera. More particularly, this invention pertains to the slewing of a two-axis gimbal-mounted device with mechanical gyro stabilization.

Two degree-of-freedom gyros have been commonly employed in the prior art to maintain or stabilize the orientations of the axes of platforms, cameras and other devices with respect to the earth or inertial space. Such gyros are characterized by a mass ("rotor") that rotates is about, and thereby defines, a spin axis. Generally the device to be stabilized is fixed to the case of the gyro so that any deflection of the position of the device with respect to a stabilized axis is sensed as movement of the attached case of the gyro with respect to the stabilized and spinning rotor. This generates a corrective signal that is transmitted to a platform-fixed motor for generating a corrective force with respect to the temporarily-misaligned axis.

In many cases it is also important to be able to slew a device (such as a camera) about some preferred axes to change its orientation in space. The standard technique for doing this is to precess the gyro spin axis about the appropriate output axis. Pickoffs internal to the gyro detect the precession and coerce the supporting gimbals to follow it thereby changing the orientation of the device in space.

If the gimbal axes are aligned to the gyro axes, the slewing can be controlled about the desired axis without cross-coupling motion into the other axis. This result is only true in the prior art for steady state rates of slewing. However, in the case of low frequency oscillatory slewing (i.e. "scanning"), because the gyro dynamics includes the inertia of the gyro rotor, the gyro torquers tend to deflect the gyro spin axis about both the azimuth and pitch axes when only one axis is desired to be sinusoidally precessed. As a result, the rotor spin axis is caused to cone in an undesirable elliptical manner.

SUMMARY OF THE INVENTION

The present invention addresses the foregoing shortcomings of the prior art by providing, in a first aspect, apparatus for controlling the path of oscillatory travel of a device within a two-axis system in which the device is fixed to a two degree-of-freedom gyroscope. The gyroscope includes a first forcer for applying a torque with respect to a first rotor axis in response to a first signal to precess the rotor about a second, orthogonal rotor axis. It includes a second forcer for applying torque to the rotor with respect to the second rotor axis in response to a second signal. The angular displacement of the rotor from a null position generates a signal for activating motion to position the device within the two-axis system.

The apparatus of the invention includes at least one cross-axis circuit arranged to receive the first signal and to generate the second signal in response so that the said second signal drives the second forcer to precess the rotor with respect to the first axis to substantially cancel the effect of torque applied by the first forcer with respect to the first axis of the rotor.

In a second aspect, the invention provides apparatus for substantially nulling the effect of torque applied to precess the spinning rotor of a gyroscope. Such apparatus includes a first forcer for applying a torque with respect to a first axis of the rotor in response to a first signal. A second forcer is provided for applying a torque to the rotor with respect to a second axis in response to a second signal. The second axis is orthogonal to the first axis.

A cross-axis circuit receives the first signal and generates the second signal in response so that the second signal drives the second forcer to apply torque to the rotor with respect to the first axis by precession to cancel the torque applied to the rotor with respect to the first axis by the first forcer.

In a third aspect, the invention provides a method for substantially nulling the effect of a first torque applied by a first forcer with respect to a first axis of a spinning gyroscope rotor to precess the rotor with respect to a second, orthogonal, axis of the rotor. Such method comprises the step of applying a second torque to the rotor with respect to the second axis of the rotor to precess the rotor with respect to the first axis to substantially cancel the effect of the torque applied to the rotor with respect to the first axis by the first forcer.

The preceding and other features of this invention will become further apparent from the detailed description that follows. Such description is accompanied by a set of drawing figures. Numerals of the drawing figures, corresponding to those of the written description, point to the features of the invention with like numerals referring to like features throughout both the written text and the drawings.

DETAILED DESCRIPTION OF THE PREFERRED EMBODIMENT

Figure 1:
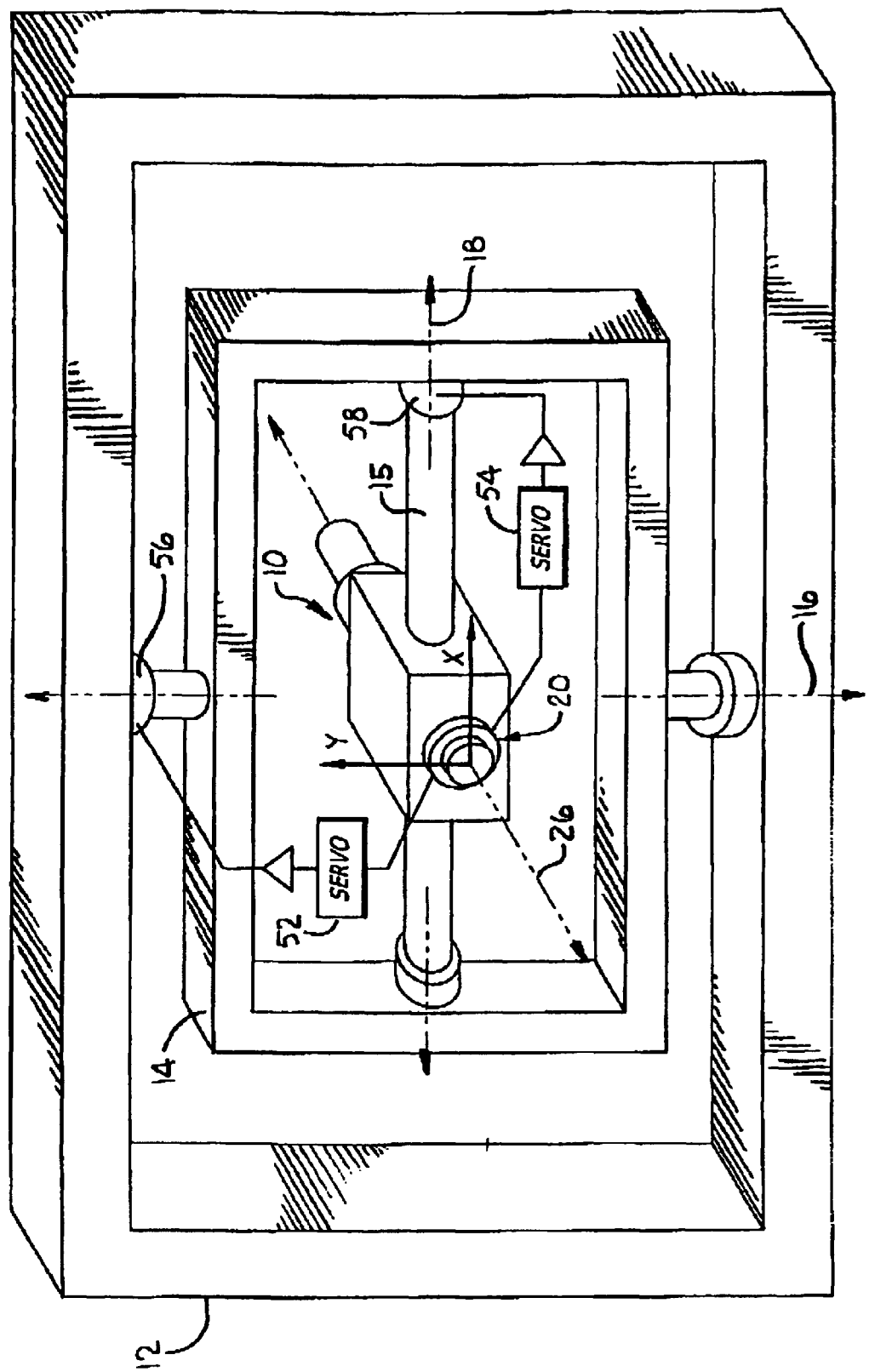
FIG. 1 is a perspective view of a camera device mounted within a two axis gimbal and including a two degree-of-freedom gyro for stabilization.

FIG. 1 is a perspective view of a system for utilizing the present invention. A camera 10 is mounted for two-degree of freedom movement relative to a fixed frame 12 comprising an azimuth gimbal 14 and a pitch gimbal 15 that contains the camera 10. Azimuthal movement of the camera 10 with respect to an axis 16 is provided by the pivotal engagement of the azimuth gimbal 14 to the fixed frame 12 while movement with respect to a pitch axis 18 is provided by the pivotal engagement of the pitch gimbal 15 to the azimuth gimbal 14. Such two-axis gimbal mounting arrangements are well known to those skilled in the art.

Figure 2:
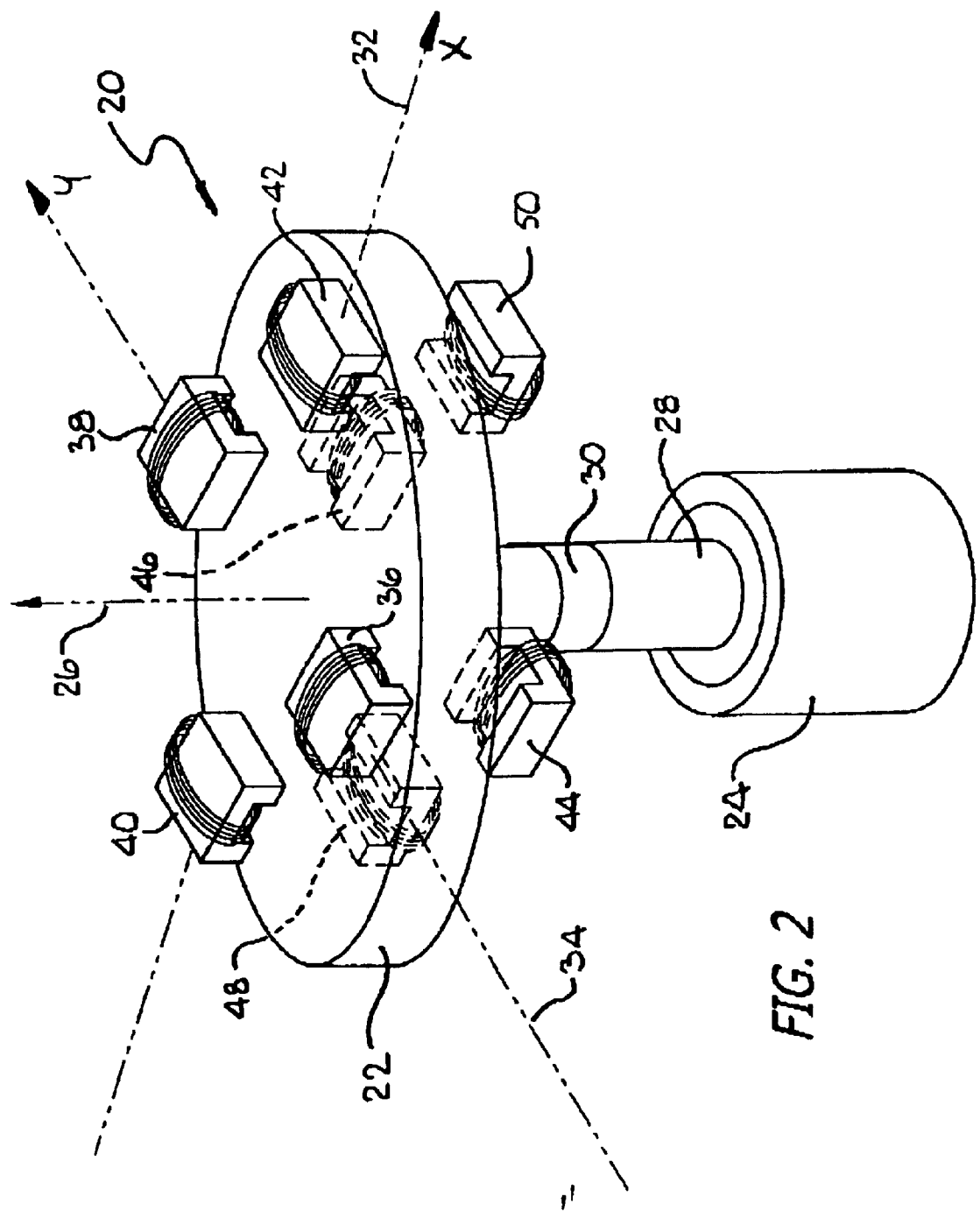
FIG. 2 is a perspective view of a two degree-of-freedom gyroscope.

The case of a two degree-of-freedom gyro 20 is fixed to either the camera 10 or to the pitch gimbal 15. The operational elements of the gyro 20 are illustrated in FIG. 2. A rotor 22 is driven by a motor 24 to define a spin axis 26. The drive shaft 28 of the motor 24 includes a universal joint 30 that permits deflection of the generally disk-like rotor 22 with respect to orthogonal case-fixed axes 32 and 34. A first forcer comprising an opposed pair of electromagnets 36, 38 is arranged to torque the disk-like rotor 22 with respect to the axis 32 while a second forcer comprising an opposed pair of electromagnets 40, 42, displaced 90 degrees therefrom, torques the rotor 22 with respect to the axis 34. A pickoff comprising opposed pair of electromagnets 44, 46 in combination detect deflection of the rotor 22 with respect to the axis 32 while a pickoff comprising opposed pair of electromagnets 48, 50 detect deflection with respect to the axis 34.

While the forcers and pickoffs will be designated throughout as comprising opposed pairs of electromagnets, the invention is not limited to forcers and pickoffs of the electromagnetic type. Rather, the invention may incorporate a variety of forcer and pickoff technologies, including, but not limited to pickoffs and forcers of the capacitive type, each of which is well known to those skilled in the art.

Either of the gyro forcers initiates the slewing process by applying a torquing force with respect to one of the axes 32, 34 of the rotor 22. This torque T causes the spinning rotor 22 to be precessed at a rate $d\theta/dt$ with respect to the orthogonal axis. Such precession with respect to the orthogonal axes 32, 34 is defined as follows:

$$d\theta_{34}/dt = T_{32}/H \quad (1)$$

$$d\theta_{32}/dt = T_{34}/H \quad (2)$$

where H, the angular momentum of the spinning rotor, is defined as $$H = CN \quad (3)$$

and

C=polar moment of inertia of rotor 22 about its spin axis; and

N=spin speed.

The precession due to the application of torque $T_{32}$ about the axis 32 or torque $T_{34}$ about the axis 34 is detected by the appropriate pickoffs and input, as an error signal, to one of servos 52, 54 for energizing gibmal torquer motors 56, 58 respectively. The torquer motors 56, 58 rotate the camera 10 about the azimuth and pitch axes 16 and 18. In operation, the servos 52, 54 energize the torquer motors 56, 58 rotating the orientation of the case of the gyro 20, and the position of the pickoffs comprising opposed pairs of electromagnets 44 through 50 until they again assume a null position relative to the new orientation of the rotor 22. In this way, the position (pointing direction) of the camera 10 is stabilized in in its new orientation in this two axis gimbal system using a two degree of freedom gyro.

Problems arise when one attempts to slew the camera 10 back and forth in an oscillatory manner at a low frequency. A forcer comprising one of the opposed pairs of electromagnets 36, 38 or 40, 42 is driven to apply a torque T to tilt the rotor 22 about one of the axes 32 or 34 in a periodic or oscillatory manner at frequency f, the deflection of the rotor 22 is not limited to only the desired precession. Rather, due to the inertia of the rotor 22, the following reactions are also observed:

$$d\theta_{32}/dt = A dT_{32}/dt \quad (4)$$

$$d\theta_{34}/dt = A dT_{34}/dt \quad (5)$$

where $$A = 1/H\omega_{nut}$$

$\omega_{nut}$=nutation frequency (=H/I where I is the moment of inertia of the rotor 22 about a diametrical axis, approximately ½ C for a flat rotor).

As a result of the undesired presence of the cross-coupling of motions with respect to both of the axes 32 and 34, detected by the pairs of pickoffs associated with each axis, error signals are generated and transmitted to each of the servos 52 and 54. The servos 52 and 54 simultaneously drive the torquer motors 56 and 58 to rotate the camera 10 to null the error signals that result from the precession and direct deflections of the rotor 22. This results in undesired off-axis motion of the camera 10 rather than the strictly back-and-forth scanning that is desired. As the torque is applied in an oscillatory manner at some low frequency f, the camera 10 is subject to an elliptical coning type of motion with the ratio of motion about the cross-axis relative to the driven axis defined by $f/f_{nut}$, where $f_{nut} = \omega_{nut}/2\Pi$. For example, should it be desired to slew (or scan) about one axis at 20 Hz and the nutation frequency is 500 Hz, an undesired 4 percent cross-coupling motion occurs on the other axis. Typical operational requirements for cross-coupling are better than −60 dB or 0.1 percent.

As disclosed above, the cross-axis precession rate is equal (subject to a scale factor) to the torque T applied, while the rate of deflection about the direct axis is a function of the rate of application dT/dt of the torque. In the invention, undesired motion about the direct axis is nulled to eliminate coning of the gyro spin axis. This is accomplished by generating a signal that directly torques the rotor 22 with respect to the cross axis to thereby cause a counteracting precession torque to act upon the direct axis that cancels out the direct axis angular deflection. As the relationship between the torque T and the rates of direct deflection and precession of the rotor 22 are known (see equations 1, 2, 4 and 5), the signal for directly driving cross-axis motion to cause precession with respect to the direct axis that offsets the direct deflection of the axis is derived from the original drive signal.

Figure 3:
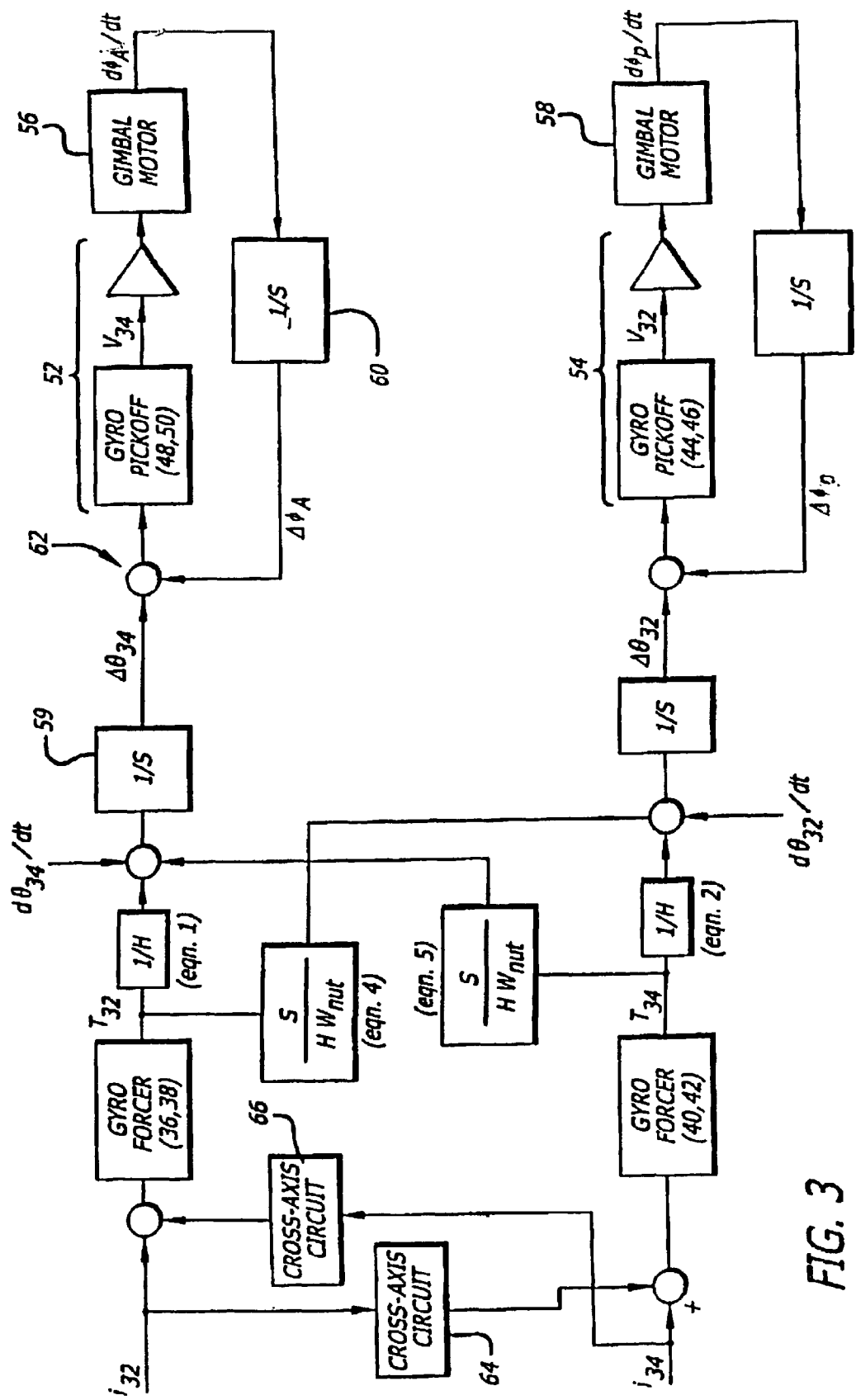
FIG. 3 is a block diagram of the invention for stabilizing a device that is movable about two axes and stabilized by a two degree-of-freedom gyroscope.

FIG. 3 is a block diagram for illustrating a two-axis system according to the prior figures (and equations) that incorporates the invention. The discussion that accompanies this figure will make frequent reference to elements of the systems of the prior figures by employing like numerals.

The invention comprises the addition of complementary cross-axis differentiator circuits 64, 66 into a two axis system with a two degree of freedom gyroscope. As shown, periodic currents $i_{32}$ and $i_{34}$ for energizing the forcers comprising opposed pairs of electromagnets 36, 38 and 40, 42 to precess the rotor 22 with respect to the axes 34 and 32 respectively are each tapped and input to a differentiator circuit 64, 66 then fed to the cross-axis torquer pair. That is, a first signal comprising the gyro torquer current $i_{32}$, in addition to directly driving the gyro comprising opposed pair of electromagnets 36, 38, is directed to drive the cross-axis forcer comprising the opposed pair of electromagnets 40, 42 through the differentiator circuit 64. Likewise, a second signal comprising the gyro torquer current $i_{34}$ drives the cross-axis forcer comprising the opposed pair of electromagnets 36, 38 through the differentiator circuit 66 in addition to directly driving the gyro forcer comprising the opposed pair of electromagnets 40, 42.

In operation, precession of the rotor 22 about the axis 34 results from the torquing of the rotor 22 with respect to the axis 32. This is initiated by inputting current $i_{32}$ to the gyro forcer comprising the opposed pair of electromagnets 36, 38 to produce a rate $d\theta_{34}/dt$. The integration of this rate, represented by a block 59, tilts the rotor about the axis 34 by an angle $\Delta\theta_{34}$. Such tilting of the rotor 22 offsets the rotor's spin axis 26 from null with respect to the gyro case. Within an upper feedback loop for controlling slewing with respect azimuth, this offset is detected by gyro pickoff comprising opposed pair of electromagnets 48, 50 and a pickoff voltage $V_{34}$ is generated. Such pickoff voltage $V_{34}$ is amplified, servo compensated by the servo 52 and then applied to the azimuth gimbal motor 56 to cause the camera 10 to slew about azimuth gimbal axis 16 at a rate $d\Phi_A/dt$. The integration of the slewing rate at an integrator 60 results in the slewing or sweeping of the camera 10 through an angle $\Delta\Phi_A$. The slewing angular displacement of the camera 10, $\Delta\Phi_A$, is compared with the precession displacement of the rotor 22, $\Delta\theta_{34}$, at a difference junction 62 of the servo loop 52. The slewing motion of the camera 10 is completed at such time as the angular diaplacements of the rotor 22 and the camera 10 are equal to one another. This mode of operation is likewise employed for servoing the pitch axis (note the like feedback loop for controlling slewing with respect to pitch that lies below the just-described feedback loop for controlling slewing with respect to azimuth).

At the same time that the current $i_{32}$ is applied to the forcer comprising the opposed pair of electromagnets 36, 38, it is applied to a cross-axis circuit 64. An output of the cross-axis circuit 64 is received as an input to gyro forcer comprising the opposed pair of electromagnets 40, 42. (Likewise, a second cross-axis circuit 66 is arranged to receive an input current $i_{34}$ for slewing the rotor 22 with respect to the axis 32 and to direct the output of the circuit 66 to the forcer comprising the opposed pair of electromagnets 36, 38).

It shall be seen that each of the cross-axis circuits 64 and 66 is arranged to provide an output that is the derivative of an input function and a gain such that, when input to the cross-axis gyro forcer, a precession torque will be generated that cancels the undesired deflection of the rotor 22 with respect to the axis of initial application of torque. For example, the output of the cross-axis circuit 64 drives the gyro forcer comprising the opposed pair of electromagnets 40, 42 to torque the rotor 22 to precess with respect to the axis 32 by an amount equal and opposite to the deflection of the rotor 22 with respect to the axis 32 by the direct application of the current $i_{32}$ to the forcer comprising the opposed pair of electromagnets 36, 38.

Referring to equations 1, 2, 4 and 5, it can be seen (with respect to the application of the current $i_{32}$) that, while the rate of precession $d\theta_{34}/dt$ is a function of the torque $T_{32}$, the rate $d\theta_{32}/dt$ is a function of the rate of torquing $dT_{32}/dt$. In the invention, the undesired deflection of the rotor 22 with respect to the direct axis (as opposed to the axis about which precession takes place) is overcome by directly applying a function to the cross-axis gyro torquer pair that generates a precession torque $-dT_{32}/dt$. Such a cross-axis circuit 64 or 66 is characterized by a LaPlace transfer function of the form $$T(s) = s/(2\Pi \cdot f_{nut}) \quad (6)$$

which defines a derivative function. When a periodic oscillatory signal of the form $\sin 2\Pi ft$, for example, directly torques the rotor 22, the output of the cross-axis circuit is of the form $(f/f_{nut})\cos 2\Pi ft$. Likewise, when a periodic oscillatory signal of the form $\cos 2\Pi ft$ directly torques the rotor 22, the output of the cross-axis circuit is of the form $-(f/f_{nut})\sin 2\Pi ft$. In either case, the output from the cross-axis circuit generates a precession torque that is equal and opposite to the undesired direct torquing of the rotor.

Figure 4:
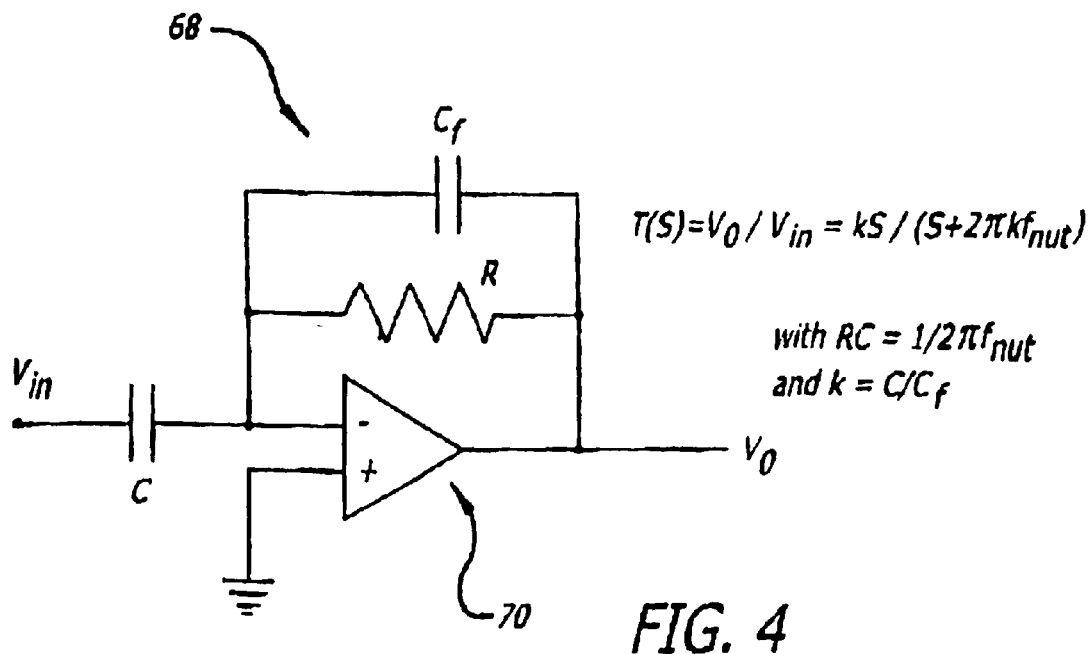
FIG. 4 is a schematic diagram of a differentiator circuit for use in the invention.

While the above transfer function for the cross-axis differentiator circuit will produce the desired offsetting torquing signal for nulling cross-axis motion, it provides a derivative gain that results in noisy operation due to the increase of gain with frequency. For this reason, better performance, coupled with the desired cancellation of cross-axis motion, is provided by a circuit arrangement in which high frequency gain is rolled off to prevent noise degradation. Such a differentiator circuit for use in the invention is illustrated by the schematic diagram of FIG. 4. The circuit 68 (used in cross-axis circuits 64 and 66) comprises an operational amplifier 70 that includes a feedback capacitor $C_f$ in parallel with a feedback resistor R. An input capacitor C completes the circuit. Such a circuit is characterized by a transfer function of the form $T(s) = V_o/V_{in} = ks/(s+2\Pi kf_{nut})$ with $RC = 1/2\Pi f_{nut}$ and $k = C/C_f$.

Figure 5:
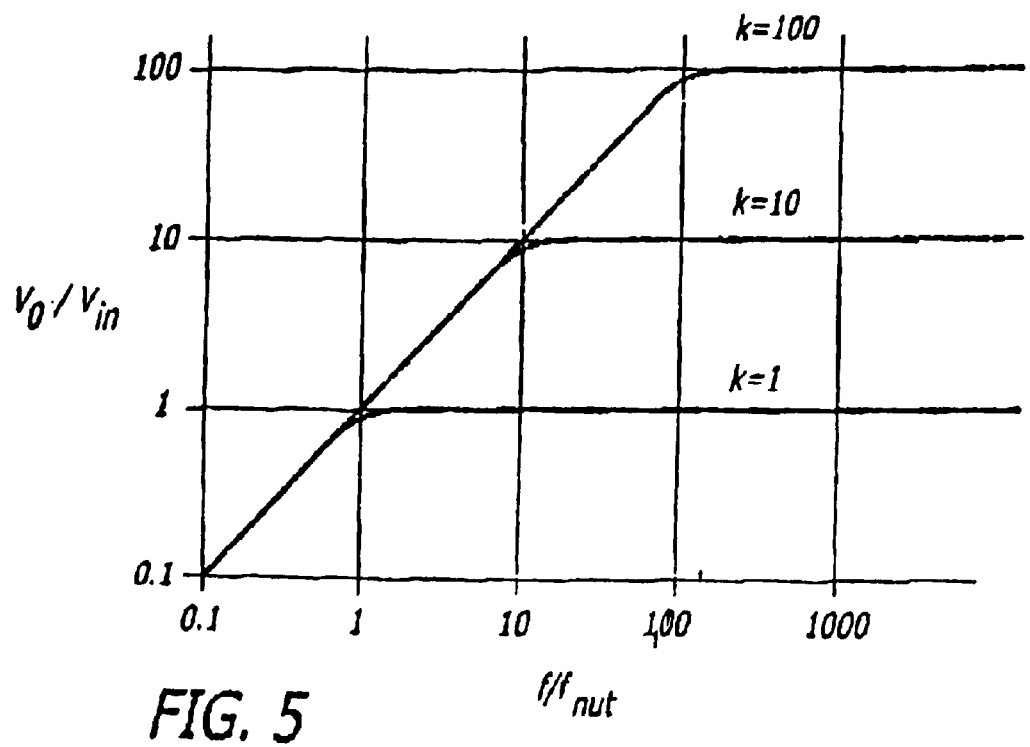
FIG. 5 is a graph of the frequency response of a differentiator circuit in accordance with the invention.

FIG. 5 is a graph of the frequency response of the transfer function of the circuit 68. As can be seen, at lower frequencies, the gain is $s/2\Pi f_{nut}$ as desired. At higher frequencies, gain reaches and maintains the constant value k, thereby avoiding the noise problem at high frequencies.

While the invention has been described with reference to its presently-preferred embodiment, it is not limited thereto. Rather, this invention is limited only insofar as it is defined by the following set of patent claims and includes within its scope all equivalents thereof.

What is claimed is:

1. Apparatus for oscillating a device fixed to a two degree of freedom gyroscope having a spinning rotor, said device being associated with a two-axis system said apparatus comprising, in combination:
    a) said gyroscope including a first forcer for applying a first torque with respect to a first rotor axis in response to a first alternating signal and a second forcer for applying a second torque to said rotor with respect to a second, orthogonal rotor axis in response to a second signal;
    b) a first pickoff for detecting deflection of said rotor about said first rotor axis and generating a first pickoff signal in response and a second pickoff for detecting deflection of said rotor about said second rotor axis and generating a second pickoff signal in response;
    c) a first motor for driving said device about a first device axis in response to said first pickoff signal and a second motor for driving said device about a second device axis in response to said second pickoff signal; and
    d) a cross-axis circuit for receiving said first signal and deriving the second signal as the derivative thereof.

2. Apparatus as defined in claim 1 wherein said device is a camera.

3. Apparatus as defined in claim 1 wherein a gain of said at least one cross-axis circuit is inversely proportional to a nutation frequency of said rotor.

4. Apparatus as defined in claim 1 wherein a transfer function T(s) of said at least one cross-axis circuit is $$T(s) = Ks/(s+2\Pi kf_{nut})$$

where k is an integer and $f_{nut}$ is a nutation frequency of said rotor.

5. Apparatus as defined in claim 1 wherein said at least one cross-axis circuit comprises an operational amplifier.

6. Apparatus as defined in claim 5 wherein said at least one cross-axis circuit comprises said operational amplifier including a feedback resistor in parallel with a feedback capacitor.

7. Apparatus as defined in claim 1 further comprising a second cross-axis circuit arranged to receive said second signal and to generate said first signal in response thereto.

8. Apparatus as defined in claim 7 wherein each cross-axis circuit generates an output signal comprising a derivative of an input signal.

9. Apparatus as defined in claim 8 wherein a gain of each cross-axis circuit is inversely proportional to a nutation frequency of said rotor.

10. Apparatus as defined in claim 7 wherein a transfer function T(s) of each of said cross-axis circuits is $$T(s) = Ks/(s + 2\Pi k f_{nut})$$

where k is an integer and $f_{nut}$ is a nutation frequency of said rotor.

11. Apparatus as defined in claim 7 wherein each of said cross-axis circuits comprises an operational amplifier.

12. Apparatus as defined in claim 11 wherein each of said cross-axis circuits comprises said operational amplifier including a feedback resistor in parallel with a feedback capacitor.

* * * * *